Feb. 19, 1924.    1,484,252
J. A. CARY ET AL
COTTON CHOPPER
Filed Feb. 11, 1920
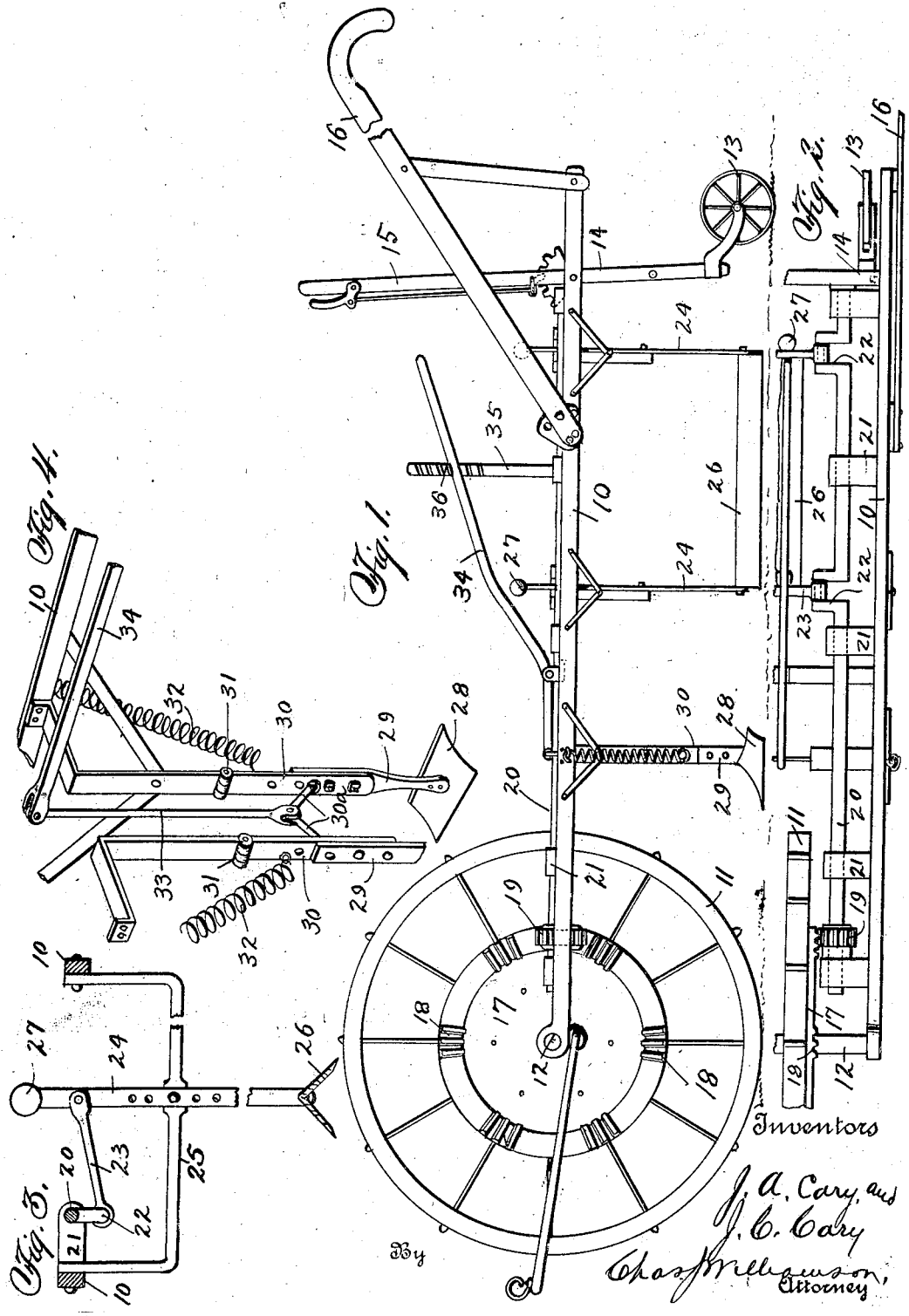

Patented Feb. 19, 1924.

1,484,252

UNITED STATES PATENT OFFICE.

JAMES A. CARY AND JESSE C. CARY, OF TUPELO, ARKANSAS.

COTTON CHOPPER.

Application filed February 11, 1920. Serial No. 357,955.

*To all whom it may concern:*

Be it known that we, JAMES A. CARY and JESSE C. CARY, citizens of the United States, residing at Tupelo, in the county of Jackson and State of Arkansas, have invented certain new and useful Improvements in Cotton Choppers, of which the following is a specification, reference being had therein to the accompanying drawing.

Our invention aims to provide a machine that will not be complicated or expensive by which hard and expensive hand labor may be saved in the cultivation of cotton, and to this end said invention consists in the machine constructed substantially as hereinafter specified and defined by or included within the scope of the appended claims.

In the drawings:—

Fig. 1 is a side elevation of our machine;

Fig. 2 is a top plan view of one half of the same;

Fig. 3 is a detail view in cross section to show the knife vibrating mechanism; and Fig. 4 is a detail view in perspective of the scraper adjusting mechanism.

Our machine has a light frame 10 that consists of two parallel side bars and cross bars that connect the side bars, with a pair of wheels 11 at the front on an axle or shaft 12, said wheels being separated or spaced apart so that as the machine moves along they will straddle the row of cotton to the left. At the rear, and preferably at each side, is a caster wheel or roller 13 carried by a lever 14 pivoted to the frame side bar and adapted to be swung to raise and lower the frame, by a hand lever 15. Also at the rear and at each side, a guiding handle 16 is provided. The machine of course, is drawn along by a draft animal, or animals.

At the side of one of the wheels 11, and fixed thereto so as to turn with it, is a disk 17 having on its outer side, at regular intervals, gear teeth 18, the disk being thus a mutilated crown gear, which teeth, in succession, mesh with and revolve a pinion 19 on a horizontal shaft 20 that extends from front to rear and parallel with the adjacent frame side bar from which at intervals it is supported, and journalled, by inwardly projecting brackets 21. The shaft is thus intermittently revolved as the machine moves along. Said shaft has two cranks 22, each of which is connected by a link or pitman 23 with an upstanding lever 24 that is pivoted between its ends to a frame cross bar 25 and at its lower end has attached to it a cotton chopping knife 26, which by the action of the crank shaft is swung to and fro, transversely of the machine. Said knife is in the form of an inverted V in cross section and thus chops first with one blade, on one side and then with the other blade on the other side. The upper end of each lever 24 is weighted, as by a ball 27 to counterbalance the knife.

Forward of the chopping knife are two scrapers 28, each being attached to a shank 29 that is adjustably attached to a bar 30 that is pivoted by a hinge 31 at its upper end, to a vertical bar secured to one of the side bars of frame 10. The hinge axis is lengthwise of the machine so that the two opposing scraper supporting bars 30 are movable crosswise of the machine and towards and from each other to vary the distance apart of the scrapers. A coil spring 32 at each side of the machine reaches from a scraper carrying bar 30, to which it is connected below its hinge, to the frame side bar and acts normally to swing the scraper outward. To swing the bars simultaneously inward, to move the scrapers closer together, we connect the two bars 30 by a flexible connection consisting of two links 30ª, and connect to the link joint the lower end of a vertical rod 33 whose upper end is pivoted to a hand lever 34 by which the link joint may be raised and thus the two scrapers shifted towards each other. A vertical bar or post 35 has a vertical series of teeth 36 for engaging the lever to latch it to hold the scrapers at a desired adjustment with reference to each other and the cotton plants.

By our machine, the operations of scraping and chopping proceed simultaneously. It is useful when the cotton is just coming through the ground, and also after the cotton begins to leaf out.

We claim:—

1. A machine of the class described having a wheel-supported frame, a pair of implement-carrying standards, a pivoted connection between each of said standards and the frame on which the standards may move to and from each other, yielding means tending to swing said standards in one direction of their relative movement, and manual means to move them in the opposite direction comprising a hand lever extending longitudinally of the machine, a rod pivotally connected with said lever and extending downwardly therefrom between said standards and links extending between and connecting such standards pivoted together and to the lower end of said rod.

2. A machine of the class described having a wheel-supported frame, a pair of implement-carrying standards, a pivoted connection between each of said standards and the frame on which the standards may move to and from each other, a spring acting on each standard to swing it in one direction, a lever, and connections between said lever and both standards to simultaneously move them in opposition to the springs, the said lever extending longitudinally of the machine and said connections comprising links extending between the standards and pivoted to each other, and a vertical rod extending upward from said links to said lever and pivotally connected to the links and to the lever.

In testimony whereof we hereunto affix our signatures.

JAMES A. CARY.
JESSE C. CARY.